UNITED STATES PATENT OFFICE.

DANL. E. SOMES, OF WASHINGTON, DISTRICT OF COLUMBIA.

IMPROVED MODE OF COOLING THE AIR IN BUILDINGS.

Specification forming part of Letters Patent No. 44,672, dated October 11, 1864.

*To all whom it may concern:*

Be it known that I, DANIEL E. SOMES, of Washington, in the District of Columbia, have invented a new and useful method of lowering the temperature of the air in the interiors of buildings or excavations in the earth, and of ventilating the same; and I do hereby declare that the following is a full and exact description of the same.

It is a well-known fact that the temperature of the atmosphere is lowered in proportion as it is rarefied, and my invention rests on this principle. My object is to produce a low temperature in a building or excavation in the earth for the purpose of curing and preserving animal and vegetable substances and for the manufacture of ice, and also to secure ventilation. To accomplish this object I make an excavation in the earth, or construct a building, either wholly or partially above the surface of the ground, with walls, roof, and floor of sufficient strength to resist the pressure of the outside atmosphere, and of sufficient solidity to prevent its entrance when the air within is partially exhausted. I may also use for the same purpose and to exclude heat a series of walls, roofs, and floors, with any non-conducting medium between. By means of air-pumps or their equivalents I exhaust the air in the interior of the building or excavation to the extent requisite to produce the desired temperature. I also use air-tubes to admit the external air in the quantity desired, and conduct these tubes in excavations below the surface of the ground, or through tanks, wells, fountains, or any body or stream of water, or through ice, to cool the air before admitting it into the building. This method of cooling and ventilating buildings may be applied to hospitals, factories, or other structures, and the air may be drawn out by the pumps to any desired extent, and the supply regulated by means of cocks, valves, or registers connected with the tubes above described, thus cooling and purifying the atmosphere at the same time.

What I claim as my invention, and desire to secure by Letters Patent, is—

1. Lowering the temperature in buildings or excavations in the earth by rarefying the atmosphere of the same in the manner and for the purpose set forth.

2. Ventilating the interior of buildings or rooms in the manner described.

D. E. SOMES.

Witnesses:
    JNO. D. PATTEN,
    A. MOORE.